(12) United States Patent
Glen et al.

(10) Patent No.: US 6,208,784 B1
(45) Date of Patent: Mar. 27, 2001

(54) FIBER OPTIC MULTIPLE ACCESS SYSTEM

(75) Inventors: Bryan David Glen, Vancouver (CA); Dennis Joseph Denen, Westerville, OH (US)

(73) Assignee: Multiplex Raceway Systems, Inc., Seattle, WA (US)

( * ) Notice: Subject to any disclaimer, the term of this patent is extended or adjusted under 35 U.S.C. 154(b) by 0 days.

(21) Appl. No.: 09/206,819

(22) Filed: Dec. 7, 1998

(51) Int. Cl.[7] .............................. G02B 6/26; G02F 1/035
(52) U.S. Cl. ............................ 385/48; 385/2; 385/146; 385/147; 385/31; 385/39; 359/173
(58) Field of Search ................ 385/48, 146, 147, 385/31, 39, 2; 359/333, 346, 173

(56) References Cited

U.S. PATENT DOCUMENTS

| | | |
|---|---|---|
| 4,650,278 | 3/1987 | Maciejko et al. . |
| 4,741,585 | 5/1988 | Uken . |
| 5,039,189 * | 8/1991 | Lytel et al. .............................. 385/2 |
| 5,052,937 | 10/1991 | Glen . |
| 5,183,406 | 2/1993 | Glen . |
| 5,206,497 | 4/1993 | Lee . |
| 5,410,628 | 4/1995 | Paton et al. . |
| 5,673,344 | 9/1997 | Li et al. . |
| 5,825,960 * | 10/1998 | Woodward et al. ................. 385/135 |
| 6,088,497 * | 7/2000 | Phillips et al. ........................ 385/48 |

* cited by examiner

Primary Examiner—Frank G. Font
Assistant Examiner—Layla Lauchman
(74) Attorney, Agent, or Firm—Klarquist Sparkman Campbell Leigh & Whinston, LLP

(57) ABSTRACT

Existing fiber optic transmission systems do not provide for or permit a raceway arrangement for optically transmitted signals which would allow flexible access to such signals. The present invention provides a system for providing multiple access to a fiber optic transmission at selected locations along a continuum. It does this by providing an elongated housing having a front panel defining a hollow interior within the housing, having an elongated slot extending along the length of the front panel, an input fiber optic cable for supplying an input optical signal to the input end of the housing, an output fiber optic cable for carrying an output optical signal from the output end of the housing, an optical repeater amplifier coupled to an LED or laser for converting the input optical signal into a light signal travelling in free space within the hollow interior of the housing, a photo sensor coupled to an optical repeater amplifier for converting the light signal travelling in free space within the hollow interior of the housing into an output optical signal, and movable tapping means extending through the slot for positioning at a selected location along the length of the slot and redirecting a portion of the light signal into a tapping output fiber optic cable.

10 Claims, 3 Drawing Sheets

FIBER OPTIC MULTIPLE ACCESS SYSTEM

TECHNICAL FIELD

The invention relates to the field of coupling light into or out of an optical fiber and more particularly to a raceway for providing selective access to an optical signal in free space.

BACKGROUND ART

For many types of communication signals or power supply, it is useful to provide a raceway so that connections can be made to the communication signal or power supply at any desired location along a continuum. By way of example is the present co-inventors U.S. Pat. No. 5,052,937 issued Oct. 1, 1991 and U.S. Pat. No. 5,183,406 issued Feb. 2, 1993, both entitled "Baseboard with Movable Electrical Outlet" which disclose a baseboard having a continuous raceway in which an electrical outlet, cable TV outlet, telephone jack or the like can be selectively positioned at any point on the raceway for connecting a telephone, TV or electrical appliance. Increasingly, communications signals are being transmitted by fiber optic cable. Data and voice signals are transmitted by fiber optic cable in telephone systems and computer networks utilize optical fiber connections. However useful means are not available to permit a raceway arrangement for optically transmitted signals which would allow flexible access to such signals.

Various arrangements are available to tap into a fiber optic cable, but these involve connections at a fixed location where the cladding on the cable has been removed and the cable bent to permit light to escape. See for example U.S. Pat. No. 4,741,585 Uken issued May 3, 1988. Such arrangements do not permit access to the signal at a randomly selected location along a continuum. There is therefore a need for a continuous optical access system.

It is therefore an object of the invention to provide a raceway-like system for permitting access to an optical signal at a selected locations along a continuum.

DISCLOSURE OF INVENTION

The present invention provides a system for providing multiple access to a fiber optic transmission at selected locations along a continuum comprising:

a) an elongated housing having a front panel defining a hollow interior within the housing, having input and output ends and an elongated slot extending along the length of the front panel;

b) input fiber optic transmission means for supplying an input optical signal to the input end of the housing;

c) output fiber optic transmission means for carrying an output optical signal from the output end of the housing;

d) means communicating with the input fiber optic transmission means for converting the input optical signal into a light signal travelling in free space within the hollow interior of the housing;

e) means communicating with the output fiber optic transmission means for converting the light signal travelling in free space within the hollow interior of the housing into an output optical signal; and f) tapping means extending through the slot for removably positioning at a selected location along the length of the slot and redirecting a portion of the light signal into a Tapping output fiber optic transmission means.

BRIEF DESCRIPTION OF DRAWINGS

In drawings which disclose a preferred embodiment of the invention.

BEST MODE(S) FOR CARRYING OUT THE INVENTION

Figure 1:
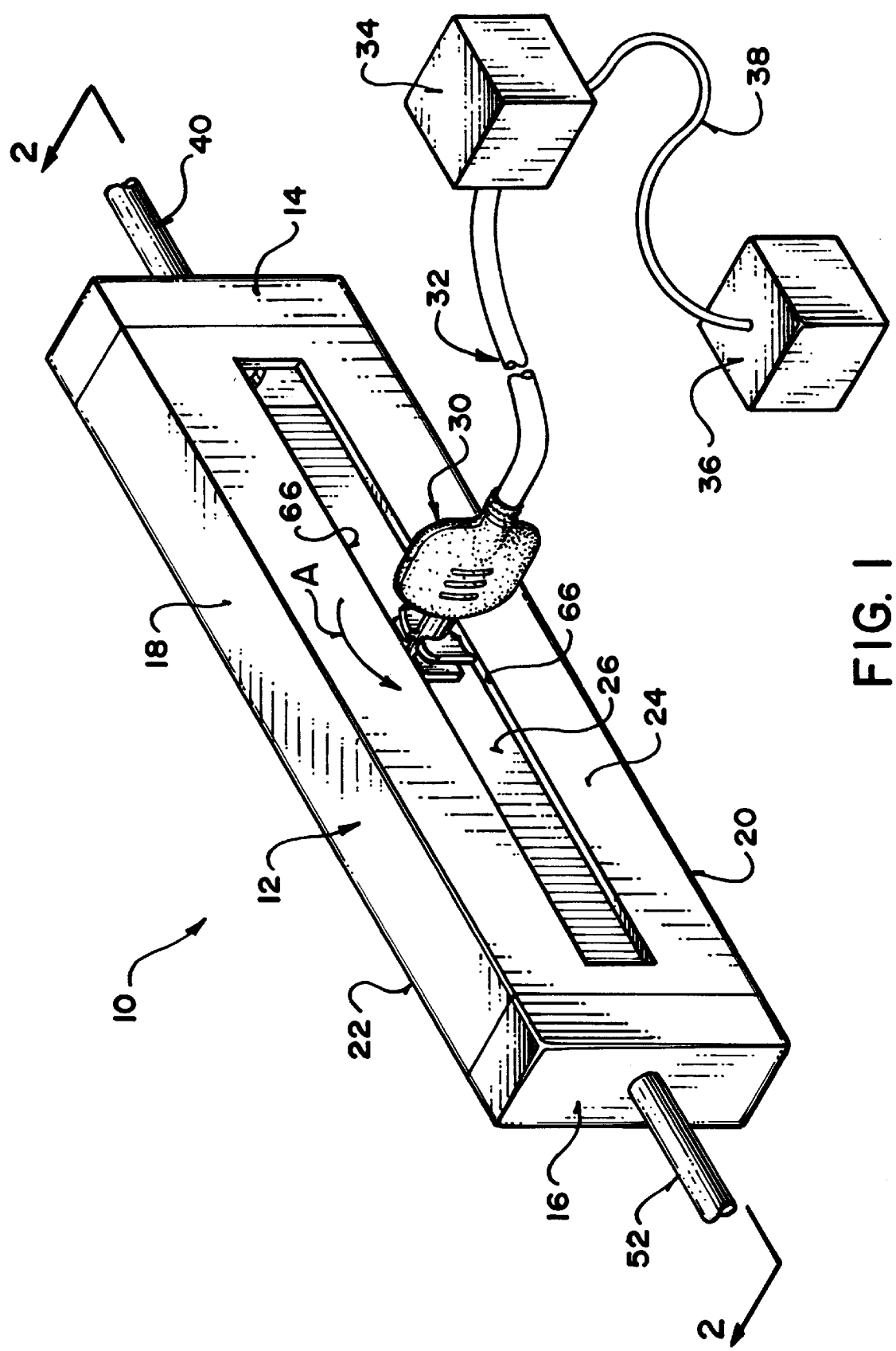
FIG. 1 is an isometric view of an optical access system of the invention.

With reference to FIG. 1, the optical access system of the invention is designated generally at 10. It has a hollow, four-sided rectangular raceway body 12 having an input housing 14 at one end and an output housing 16 at the other end. It has top and bottom surfaces 18, 20, a rear face 22 and front face 24. A slot or elongated opening 26 runs along the length of front face 24. Although the system could be utilized for two or more optical cables by providing multiple slots 26 opening into multiple parallel chambers in body 12, FIG. 1 shows a single slot 26 for access to the signal on a single input fiber optic cable 28. Slidably mounted within slot 26 is a an optical tap 30, which is connected by optical cable 32 to an optic-electric converter 34 which converts the optical signal to an electrical signal. Electric cable 38 delivers the electrical signal to a peripheral device 36 such as a telephone, printer, computer or the like.

Figure 2:
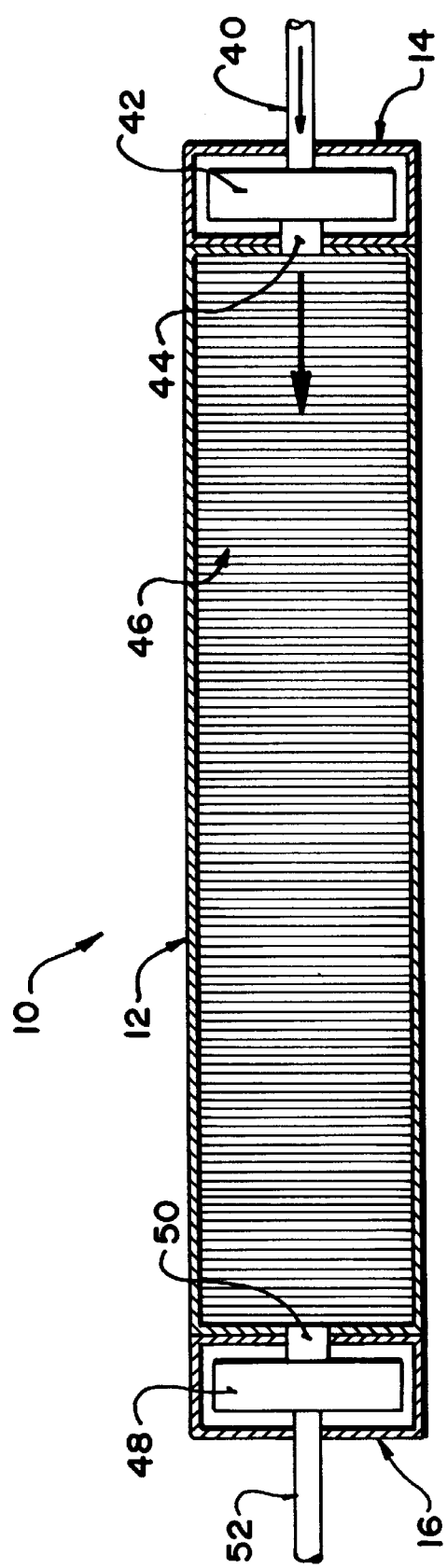
FIG. 2 is a cross-sectional view of the optical access system of FIG. 1 taken along lines 2—2.

With reference to FIG. 2, input fiber optic cable 40 is connected to repeater/amplifier 42 which converts the optic signal to an electrical signal and amplifies same. The amplified electrical signal is provided to a light source such as a laser or Light Emitting Diode 44, which normally forms part of the optical repeater, opening into the interior chamber 46 of body 12 and which floods the interior chamber 46 with free space, coded light signals. Photo sensor 50 picks up the free space optical signal and converts it to an electrical signal, which is then amplified and converted to an optical signal by repeater amplifier 48, which optical signal is then transmitted by output cable 52. Suitable optical repeater amplifiers are manufactured by a number of manufacturers, including the Light Link Series II™ broadband optical repeater produced by Pacific Broadband Networks, and which incorporates the light output 44 into the optical repeater by way of a laser diode.

Figure 3:
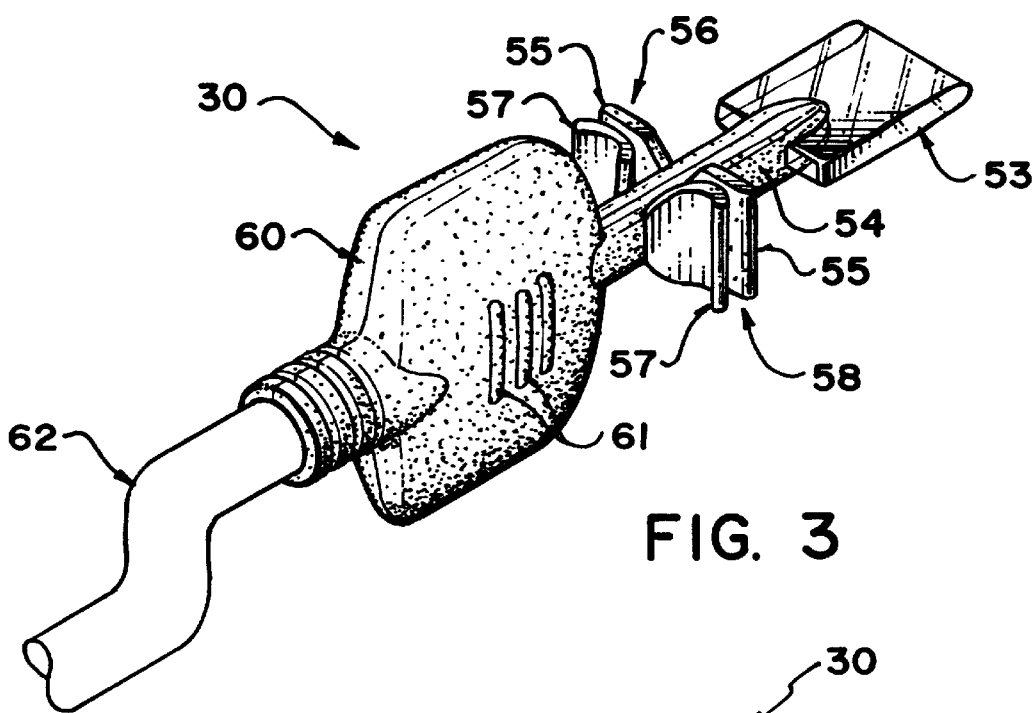
FIG. 3 is an isometric view of an optical tap for use with the access system shown in FIG. 1.
Figure 4:
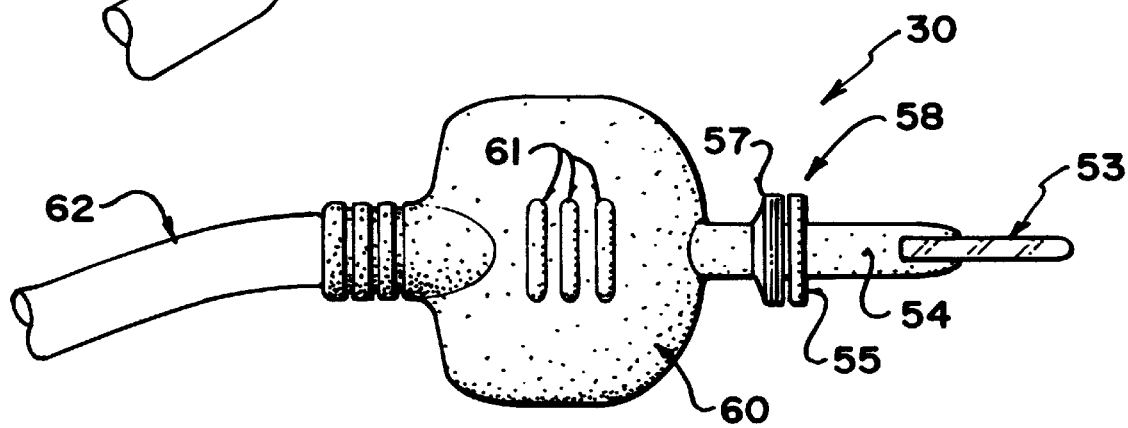
FIG. 4 is a side view of the optical tap shown in FIG. 3.
Figure 5:
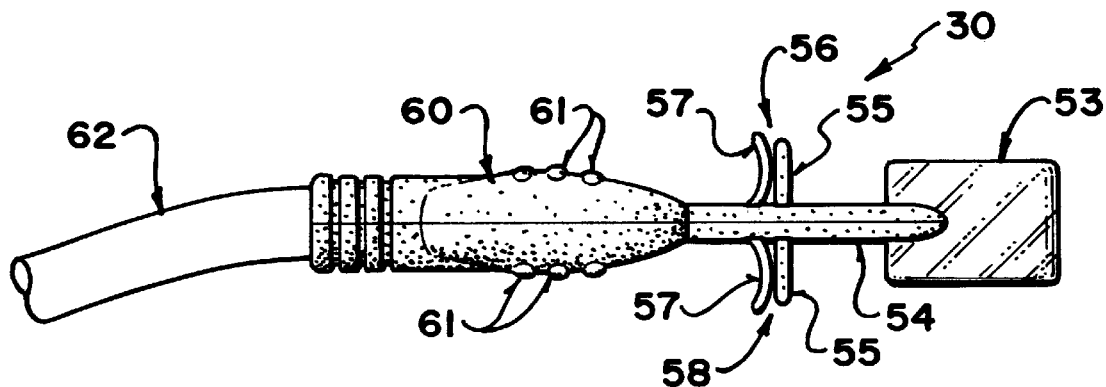
FIG. 5 is a side view of the optical tap shown in FIG. 3.

Optical tap 30, shown in FIG. 3, has a prism mirror 52 mounted on the end of extension 54 which is sized to extend into slot 26. Locking lugs 56, 58 are provided on extension 54, and a plastic body 60, with ridges 61 allows the optical tap to be easily grasped and twisted by the user. The prism mirror is optically connected to a fiber optic cable which runs through extension 54, through body 60 and out the output cable 62. Locking lugs 56, 58 each have two elements, a rigid plate 55 and a curved resilient spring plate 57 biased against plate 55. The spacing between elements 55 and 57 snugly receives the edges 66 of slot 26 so that when the tap 30 is inserted into slot 26, as shown in FIG. 1, and rotated in direction A, the edges 66 of slot 26 are held in a tight fit between elements 55 and 57 to retain the optical tap in place in slot 26. Other ways of removably securing the optical tap in place will be apparent, such as using offset lugs which bear against the inside and outside surfaces respectively of edges 66, lugs which snap into tracks on the inside of edges 66, or spring driven elements of the type shown in U.S. Pat. Nos. 5,052,937 and 5,183,406 entitled "Baseboard with Movable Electrical Outlet". When rotated into place in the housing 12, the prism mirror refracts a portion of the light flooding within chamber 46 into optical cable 32 to be processed in converter 34. Slot 26 may be covered with plastic, rubber or fiber brushes to prevent insects, dust or dirt from accumulating in chamber 46.

In order to return data to the access channel, as would be desirable in a computer network, a return signal could be directed through optical tap into the chamber 46. For example, where the network uses a uni-directional flow of data, or where the data flow is bi-directional and a single line is used, the return signal could utilize a different wavelength, or time division multiplexing (which involves separating messages into discrete packets with a time slot for each device to transmit) could be used to combine incoming and return signals over the same line. Alternatively a second input fiber optic cable (not shown) could be used for a return signal, as well as a second slot 26 (not shown) for receiving another optical tap 30 (not shown) incorporating a mirror or prism to redirect the return optical signal into the free space in the second chamber in housing 12, which is then detected by a photo sensor and amplified before being transmitted over a second output fiber optic cable.

To provide longer optic access channels, or to go around corners etc., multiple raceways 10 joined by lengths of fiber optic cable can be provided end-to-end or in various configurations. While the invention has been disclosed using an elongated slot, a series of apertures into which an optical tap could be selectively inserted would also achieve the same function.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for providing multiple access to a fiber optic transmission at selected locations along a continuum comprising:

a) an elongated housing having a front panel defining a hollow interior within said housing, having input and output ends and an elongated slot extending along the length of said front panel;

b) input fiber optic transmission means for supplying an input optical signal to said input end of said housing;

c) output fiber optic transmission means for carrying an output optical signal from said output end of said housing;

d) means communicating with said input fiber optic transmission means for converting said input optical signal into a light signal travelling in free space within said hollow interior of said housing;

e) means communicating with said output fiber optic transmission means for converting said light signal travelling in free space within said hollow interior of said housing into an output optical signal; and f) movable tapping means extending through said slot for positioning at a selected location along the length of said slot and redirecting a portion of said light signal into a tapping output fiber optic transmission means.

2. The multiple access system of claim 1 wherein said means communicating with said input fiber optic transmission means for converting said input optical signal into a light signal travelling in free space within said hollow interior of said housing comprises an optical repeater amplifier for converting said optical signal into an electrical signal and amplifying same and for providing a light source coupled to said optical repeater amplifier.

3. The multiple access system of claim 1 wherein said means communicating with said output fiber optic transmission means for converting said light signal travelling in free space within said hollow interior of said housing into an output optical signal comprises a photo sensor for providing an electrical output signal and an optical repeater amplifier for amplifying said electrical output signal and converting said electrical signal into an optical signal.

4. The multiple access system of claim 1 wherein said movable tapping means comprises a mirror for redirecting a portion of said light signal in free space.

5. The multiple access system of claim 1 wherein said movable tapping means comprises a prism for redirecting a portion of said light signal in free space.

6. The multiple access system of claim 1 further comprising means for coupling said tapping output fiber optic transmission to a peripheral device.

7. The multiple access system of claim 6 wherein said peripheral device is a computer.

8. The multiple access system of claim 1 wherein said movable tapping means comprises means for removably fixing said tapping means in place in said slot.

9. The multiple access system of claim 8 wherein said means for removably fixing said tapping means in place in said slot comprises a securing element having two spaced members for receiving an edge of said slot with one member biased against a surface of said housing adjacent said slot.

10. The multiple access system of claim 9 wherein said means for removably fixing said tapping means in place in said slot comprises two of said securing elements which are placed into contact with said housing by rotation of said tapping means.

* * * * *